US012509582B2

(12) United States Patent
Yu et al.

(10) Patent No.: US 12,509,582 B2
(45) Date of Patent: Dec. 30, 2025

(54) SILICONE EMULSION AND METHOD FOR PRODUCING SAME

(71) Applicant: KCC Silicone Corporation, Seoul (KR)

(72) Inventors: Hyun Ju Yu, Gyeonggi-do (KR); Ji Hye Lee, Gyeonggi-do (KR); Ji Yoon Park, Gyeonggi-do (KR)

(73) Assignee: KCC Silicone Corporation, Seoul (KR)

( * ) Notice: Subject to any disclaimer, the term of this patent is extended or adjusted under 35 U.S.C. 154(b) by 814 days.

(21) Appl. No.: 17/434,623

(22) PCT Filed: Dec. 5, 2019

(86) PCT No.: PCT/KR2019/017049
§ 371 (c)(1),
(2) Date: Aug. 27, 2021

(87) PCT Pub. No.: WO2020/184814
PCT Pub. Date: Sep. 17, 2020

(65) Prior Publication Data
US 2022/0145076 A1    May 12, 2022

(30) Foreign Application Priority Data
Mar. 13, 2019 (KR) .................. 10-2019-0028711

(51) Int. Cl.
C08L 83/04 (2006.01)

(52) U.S. Cl.
CPC .......... C08L 83/04 (2013.01); *C08L 2201/54* (2013.01); *C08L 2205/02* (2013.01)

(58) Field of Classification Search
CPC .. C08L 83/04; C08L 2201/54; C08L 2205/02; C08G 77/04; C08J 2383/04; C08J 2483/06; C08J 3/03
See application file for complete search history.

(56) References Cited

U.S. PATENT DOCUMENTS

| 6,794,444 B2 | 9/2004 | Yamamoto et al. |
| 8,623,958 B2 | 1/2014 | Kojima et al. |
| 8,877,293 B2 | 11/2014 | Evans et al. |
| 2003/0134131 A1 | 7/2003 | Yamamoto et al. |
| 2007/0190012 A1 | 8/2007 | Feng et al. |
| 2007/0238829 A1 | 10/2007 | Paul |
| 2010/0093598 A1 | 4/2010 | Davio et al. |
| 2010/0137454 A1 | 6/2010 | Barnes et al. |
| 2011/0165206 A1* | 7/2011 | Liu ............ A61K 8/062 977/773 |
| 2012/0004354 A1 | 1/2012 | Kojima et al. |
| 2013/0122204 A1* | 5/2013 | Evans ............ C09K 23/42 427/372.2 |
| 2014/0357773 A1 | 12/2014 | Liles et al. |
| 2015/0225574 A1 | 8/2015 | Kanto et al. |
| 2018/0237720 A1 | 8/2018 | Barnes et al. |

FOREIGN PATENT DOCUMENTS

| CA | 2050258 A1 | 5/1992 |
| CN | 1942167 A | 4/2007 |
| CN | 101080440 A | 11/2007 |
| CN | 101522758 A | 9/2009 |
| CN | 102046139 A | 5/2011 |
| CN | 102348765 A | 2/2012 |
| CN | 103025834 A | 4/2013 |
| DE | 10-2007-060919 A1 | 6/2009 |
| EP | 0245658 A2 | 11/1987 |
| JP | S62-256834 A | 11/1987 |
| JP | H05-32789 A | 2/1993 |
| JP | H07-53332 A | 2/1995 |
| JP | 2003-171230 A | 6/2003 |
| JP | 2003-192896 A | 7/2003 |
| JP | 2004-352879 A | 12/2004 |
| JP | 2006-282518 A | 10/2006 |
| JP | 2013-539485 A | 10/2013 |
| JP | 2015-508116 A | 3/2015 |
| JP | 2018172491 A * | 11/2018 ........... C08G 77/388 |
| KR | 10-2004-0033186 A | 4/2004 |
| KR | 10-0684668 B1 | 2/2007 |
| KR | 10-2011-0133604 A | 12/2011 |
| WO | 2014/042188 A1 | 3/2014 |

OTHER PUBLICATIONS

English Translation of JP-2018172491-A (Year: 2018).*
Office Action issued in Chinese Patent Application No. 201980091348.7 dated Aug. 16, 2023.
Extended European Search Report issued in corresponding European Patent Application No. 19918765.9 dated Apr. 12, 2022.
International Search Report issued in corresponding International Patent Application No. PCT/KR2019/017049 dated Jun. 30, 2020.

* cited by examiner

*Primary Examiner* — Andrew J. Oyer
*Assistant Examiner* — Cullen L G Davidson
(74) *Attorney, Agent, or Firm* — Morgan, Lewis & Bockius LLP

(57) ABSTRACT

The present invention relates to a silicone emulsion comprising a silicone resin mixture and a nonionic surfactant, wherein the silicone resin mixture and the nonionic surfactant are included in a weight ratio of 1:0.1 to 1:0.4; and a method for producing same.

20 Claims, No Drawings

SILICONE EMULSION AND METHOD FOR PRODUCING SAME

TECHNICAL FIELD

The present invention relates to a transparent silicone emulsion of high concentration and a method for preparing the same.

BACKGROUND ART

A silicone emulsion is prepared by dispersing silicone in an organic solvent or water, and is typically prepared in the form of an oil/water (O/W) emulsion by diluting a silicone gum having a high viscosity with a silicone oil or siloxane having a lower viscosity than the silicone gum, and then adding a surfactant, an emulsifier, a solvent, and the like.

Particularly, a silicone emulsion of high viscosity and high solid content is typically prepared by an inversion method in which a silicone gum is mixed with a surfactant, and then water or an organic solvent is introduced thereto. The inversion method is an oil-based reaction, and typically uses a phase transition process accompanied by high-speed stirring in a scraper mixer, and a cooling process for controlling the temperature rise in a reaction tank due to the high-speed stirring.

In this regard, Japanese Patent Laid-Open No. 2015-508116 (Patent Document 1) discloses a method for preparing a silicone emulsion, wherein the method includes preparing a dispersion liquid containing 100 parts by weight of a silicone resin or a pressure sensitive adhesive and 5 to 100 parts by weight of an ethylene oxide/propylene oxide block copolymer, adding a sufficient amount of water to form an emulsion, and randomly mixing the emulsion. However, Patent Document 1 uses the above-described inversion method, so that it is difficult to emulsify an emulsion and stability is poor.

Therefore, there is a need for the research and development on a transparent silicone emulsion which is high in solid content and excellent in feeling in use and durability, and on a method for preparing the same.

DISCLOSURE OF THE INVENTION

Technical Problem

An aspect of the present invention provides a transparent silicone emulsion which is high in solid content and excellent in feeling in use and durability, and a method for preparing the same.

Technical Solution

According to an aspect of the present invention, there is provided a silicone emulsion including a silicone resin mixture and a non-ionic surfactant, wherein the silicone resin mixture and the non-ionic surfactant are included at a weight ratio of 1:0.1 to 1:0.4.

According to another aspect of the present invention, there is provided a method for preparing a silicone emulsion, the method including subjecting a non-ionic surfactant to aqueous dispersion, and dividing and introducing a silicone resin mixture 8 times or more to the aqueous dispersed non-ionic surfactant to prepare a mixture, wherein the silicone resin mixture includes a silicone resin and a diluent, and the silicone resin mixture and the non-ionic surfactant are included at a weight ratio of 1:0.1 to 1:0.4.

Advantageous Effects

A silicone emulsion according to the present invention is transparent, high in solid concentration, excellent in feeling in use and durability, and excellent in storage stability at room temperature and high temperatures.

BEST MODE FOR CARRYING OUT THE INVENTION

Hereinafter the present invention will be described in detail.

In the present invention, a 'weight average molecular weight' may be measured by a method well known in the art, and may represent, for example, a value measured by a gel permeation chromatograph (GPC) method.

Silicone Emulsion

A silicone emulsion according to the present invention includes a silicone resin mixture, and a non-ionic surfactant.

Silicone Resin Mixture

A silicone resin mixture is the main resin of a silicone emulsion, and serves to control the physical properties and performance of the silicone emulsion. At this time, the silicone resin mixture includes a silicone resin and a diluent.

<Silicone Resin>

The type of the silicone resin is not particularly limited. For example, the silicone resin may be represented by Formula 1 below.

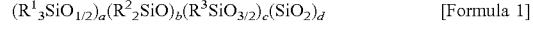

$(R^1{}_3SiO_{1/2})_a(R^2{}_2SiO)_b(R^3SiO_{3/2})_c(SiO_2)_d$     [Formula 1]

In Formula 1 above, $R^1$ and $R^3$ are each independently an alkyl group of $C_{1-10}$ or an alkenyl group of $C_{2-10}$, $R^2$ is each independently an alkyl group of $C_{1-10}$, an alkenyl group of $C_{2-10}$, or an aryl group of $C_{6-15}$, a to d are each independently 0 or greater, a+d+c+d is 4 to 10,000, and (a+d+c)/(a+b+c+d) is greater than 0 to 0.7 or less.

At this time, the alkyl group may be, for example, a methyl group, an ethyl group, a propyl group, a butyl group, a pentyl group, a hexyl group, a cyclopentyl group, a cyclohexyl group, or the like, and specifically, a methyl group, an ethyl group, or a propyl group.

In addition, the alkenyl group may be, for example, a vinyl group, an allyl group, a butenyl group, a pentenyl group, a hexenyl group, or the like, and specifically, a vinyl group or a butenyl group.

The aryl group may be, for example, a phenyl group, a tolyl group, a xylyl group, a naphthyl group, a biphenylene group, or the like, and specifically, a phenyl group.

Specifically, the silicone resin may be an MQ silicone resin composed of an M unit $[R^1{}_3SiO_{1/2}]$ and a Q unit $[SiO_2]$. For example, the MQ silicone resin may have a molar ratio (M/Q) of the M unit to the Q unit of 0.5 to 1.5:1, or 0.5 to 1:1. At this time, the $R^1$ may be, for example, an alkyl group of $C_{1-10}$, and specifically, a methyl group, an ethyl group, or a propyl group.

The silicone resin may have a viscosity of 1 to 1,000 cP at 25° C., and a weight average molecular weight (Mw) of 1,000 to 8,000 g/mol. Specifically, the silicone resin may have a viscosity of 1 to 700 cP at 25° C., and a weight average molecular weight 2,000 to 7,000 g/mol, or 3,000 to 5,000 g/mol. When the viscosity of the silicone resin is in the above range, the viscosity of a composition including the same is suitable to improve the usability of the composition, and when the weight average molecular weight of the silicone resin is in the above range, it is possible to provide a product with improved durability of an effect and feeling in use of excellent adhesion.

In addition, the silicone resin may be included in a silicone resin mixture in an amount of 30 to 60 parts by weight based on the total weight of the silicone resin mixture. Specifically, the silicone resin may be included in a silicone resin mixture in an amount of 30 to 50 parts by weight based on the total weight of the silicone resin mixture. When the content of the silicone resin is in the above range, it is possible to prepare a transparent emulsion which is excellent in feeling in use and durability.

<Diluent>

The diluent may have a viscosity of 0.1 to 200 cP at 25° C. Specifically, the diluent may have a viscosity of 0.5 to 200 cP, or 10 to 150 cP at 25° C. When the viscosity of the diluent at 25° C. is in the above range, there is an effect of improving the emulsification stability of an emulsion, and imparting feeling in use such as lightweight feeling and excellent adhesion.

In addition, the diluent may be a low molecular weight silicone oil. The low molecular weight silicone oil may be, for example, a linear organopolysiloxane such as dimethylpolysiloxane and methylhydrogenpolysiloxane, a cyclic organopolysiloxane such as octamethylcyclotetrasiloxane, decamethylcyclopentasiloxane, dodecamethylcyclohexasiloxane, tetramethyltetrahydrogencyclotetrasiloxane, and tetramethyltetraphenylcyclotetrasiloxane, and the like.

At this time, the diluent may have a weight average molecular weight of 100 to 5,000 g/mol. Specifically, the diluent may have a weight average molecular weight of 2,000 to 5,000 g/mol, or 3,000 to 5,000 g/mol.

The diluent may be included in a silicone resin mixture in an amount of 40 to 70 parts by weight based on the total weight of the silicone resin mixture. Specifically, the diluent may be included in a silicone resin mixture in an amount of 50 to 75 parts by weight based on the total weight of the silicone resin mixture. When the content of the diluent is in the above range, the viscosity of a silicone mixture is suitable to facilitate the emulsification of an emulsion, so that there is an effect of improving emulsification stability.

When the viscosity of the emulsion composition at 25° C. is in the above range, the room-temperature and high-temperature stability of an emulsion are excellent, and it is possible to prepare a transparent resin emulsion of high viscosity.

In addition, the silicone resin mixture may be included in a silicone emulsion in an amount of 50 to 70 parts by weight based on the total weight of the emulsion. Specifically, the silicone resin mixture may be included in a silicone emulsion in an amount of 50 to 65 parts by weight, or 52 to 62 parts by weight based on the total weight of the emulsion. When the content of the silicone resin mixture is in the above range, it is possible to prepare a high-viscosity transparent resin emulsion which is excellent in feeling in use and durability.

The silicone emulsion includes the silicone resin mixture and the non-ionic surfactant at a weight ratio of 1:0.1 to 1:0.4. Specifically, the silicone emulsion may include the silicone resin mixture and the non-ionic surfactant at a weight ratio of 1:0.15 to 1:0.35. When the weight ratio of the silicone resin mixture and the non-ionic surfactant is in the above range, there is an effect in that the emulsification of an emulsion is facilitated, and it is possible to prepare a high-viscosity transparent resin emulsion having excellent stability. Specifically, when the non-ionic surfactant is included in less than the above weight ratio, the emulsifying force is reduced, thereby reducing stability and viscosity, and when the weight ratio is exceeded, viscosity increases, so that stirring workability is not good.

Non-Ionic Surfactant

A non-ionic surfactant serves to improve the emulsification of the silicone resin mixture.

The non-ionic surfactant may be, for example, polyoxyethylene alkyl ether, polyoxyethylene allylalkyl ether, polyoxyalkylene alkylphenol ether, polyoxyalkylene aryl ester, polyoxyalkylene sorbic acid alkyl ester, sodium lauryl ether sulfate, stearyl trimethyl ammonium chloride, and the like.

In addition, the non-ionic surfactant may include polyalkylene glycol. Specifically, the non-ionic surfactant may be a block copolymer of polyethylene glycol (PEG) and polypropylene glycol (PPG). The block copolymer of polyethylene glycol (PEG) and polypropylene glycol (PPG) may be one or two or more block copolymers of polyethylene glycol (PEG) and polypropylene glycol (PPG) having different polymerization degrees.

In addition, the non-ionic surfactant may include PEG and PPG at a molar ratio of 2:1 to 6:1. Specifically, the non-ionic surfactant may include PEG and PPG at a molar ratio of 2.5:1 to 5.5:1, or 2.7:1 to 5.2:1. When the content of the PEG and PPG of the non-ionic surfactant is in the above range, the emulsification of the silicone resin mixture is facilitated, and it is possible to prepare a transparent resin emulsion. Specifically, when the content of PEG is high, hydrophilicity is excellent, and thus, the emulsification with a solvent is excellent.

Specifically, the non-ionic surfactant may be an ethylene oxide (EO)-propylene oxide (PO)-ethylene oxide (EO) block copolymer. More specifically, the non-ionic surfactant may be an EO-PO-EO block copolymer including the EO-PO-EO at a molar ratio of 1:1:1 to 3:1:3, or 1.4:1:1.4 to 2.6:1:2.6.

The non-ionic surfactant may have a weight average molecular weight (Mw) of 1,000 to 30,000 g/mol, and a hydroxyl value (Ohv) of 1 to 50 mgKOH/g. Specifically, the non-ionic surfactant may have a weight average molecular weight of 5,000 to 20,000 g/mol, and a hydroxyl value of 5 to 30 mgKOH/g. The hydroxyl value may be measured by a method well known in the art, and may represent, for example, a value measured by a titration method. When the weight average molecular weight of the non-ionic surfactant is in the above range, the emulsification of an emulsion is facilitated, and it is possible to prepare a high-viscosity transparent emulsion. When the hydroxyl value is in the above range, there is an effect of facilitating the emulsification of a silicone resin mixture.

In addition, commercial products of the non-ionic surfactant may be, for example, Synperonic PE/F68, PE/F87, PE/F108, PE/F127, and the like of Croda Co., Ltd. For example, as the non-ionic surfactant, Synperonic PE/F87 of Croda Co., Ltd may be used alone, or PE/F68 and PE/F108, PE/F68 and PE/F127, PE/F87 and PE/F108, or PE/F87 and PE/F127 may be mixed at a weight ratio of 4 to 6:6 to 4, and used.

The non-ionic surfactant may be included in a silicone emulsion in an amount of 5 to 25 parts by weight based on the total weight of the emulsion. Specifically, the non-ionic surfactant may be included in a silicone emulsion in an amount of 10 to 23 parts by weight, or 13 to 20 parts by weight based on the total weight of the emulsion. When the content of the non-ionic surfactant is in the above range, there is an effect of obtaining a desired particle size of an emulsion, and it is possible to prepare a transparent resin emulsion having excellent emulsification stability.

Solvent

The silicone emulsion may further include a solvent. That is, the silicone emulsion may be in a form in which the silicone resin mixture is dispersed in a solvent.

In addition, the solvent may be water, and the water may include one or more selected from the group consisting of deionized water, pure water, ultra-pure water, and distilled water.

The solvent may be included in a silicone emulsion in an amount of 15 to 40 parts by weight based on the total weight of the emulsion. Specifically, the solvent may be included in a silicone emulsion in an amount of 16 to 35 parts by weight, or 17 to 30 parts by weight based on the total weight of the emulsion. When the content of the solvent is in the above range, it is possible to prepare a transparent emulsion in which the final viscosity of the emulsion is high and storage stability is excellent.

Additive

The silicone emulsion may further include one or more additives selected from the group consisting of a preservative and a neutralizer in an amount of 0.1 to 5 parts by weight based on the total weight of the emulsion.

The preservative serves to prevent a problem in which the silicone emulsion is contaminated by microorganisms, and thus, has lowered stability. In addition, the preservative is not particularly limited as long as it is a preservative typically used in a silicone composition. For example, the preservative may include one or more selected from the group consisting of sodium benzoate, phenoxy ethanol, 1,2-hexanediol, propylene glycol, diazolidinyl urea, imidazolidinyl urea, 15quaternium, DMDM hydantoin, benzalkonium chloride, 2-bromo-2-Nitro-propane-1,3-diol, dehydroacetic acid, 2-dichloro-benzyl alcohol, sodium hydroxymethyl-glycinate, triclosan, benzoic acid, chlorobenzoic acid, benzyl alcohol, salicylic acid, sodium iodate, sorbic acid, calcium benzoate, methyl benzoate, and benzyl benzoate.

The neutralizer serves to control the pH of a silicone emulsion, and any pH adjuster which may be typically used in a silicone composition may be used without particular limitation. For example, the neutralizer may be any organic or inorganic acid such as a citric acid, an acetic acid, a lactic acid, a formic acid, a nitric acid, a glycolic acid, and a phosphoric acid.

The average particle diameter of particles of the silicone emulsion which are dispersed in a solvent may be 0.1 to 5 μm. Specifically, the average particle diameter of particles of the silicone emulsion which are dispersed in a solvent may be 0.1 to 3.5 μm, 0.1 to 1.5 μm, or 0.1 to 1.0 μm. When the average particle diameter of particles of the silicone emulsion which are dispersed in a solvent is in the above range, there is an effect in that the emulsion has a transparent appearance, excellent room-temperature and high-temperature storage stability, lightweight feeling, and excellent adhesion.

In addition, the silicone emulsion may have a viscosity of 300,000 to 1,500,000 cP at 25° C. Specifically, the silicone emulsion may have a viscosity of 350,000 to 1,300,000 cP, or 500,000 to 1,000,000 cP at 25° C. When the viscosity of a silicone emulsion at 25° C. is in the above range, there is an effect in that room-temperature and high-temperature storage stability are excellent.

The silicone emulsion may have a solid content of 40 to 80 wt % based on the total weight of the silicone emulsion. Specifically, the silicone emulsion may have a solid content of 45 to 65 wt %, or 50 to 60 wt % based on the total weight of the silicone emulsion. When the solid content of a silicone emulsion is in the above range, there is an effect in that the emulsion has lightweight feeling and excellent adhesion.

In addition, the silicone emulsion may be for cosmetics. Specifically, the silicone emulsion may be formulated into a typically prepared cosmetic formulation, for example, solution, suspension, emulsion, paste, gel, cream, lotion, powder, soap, surfactant-containing cleansing, oil, powder foundation, emulsion foundation, wax foundation and spray, but the present invention is not limited thereto. For example, the silicone emulsion may be formulated into a formulation such as softening toner, nourishing toner, nourishing cream, massage cream, essence, eye cream, cleansing cream, cleansing foam, cleansing water, pack, spray or powder.

At this time, "cosmetics" means any cosmetics which may be used on a human body to clean and beautify the human body, thereby changing the appearance thereof, or to maintain or promote the health of skin and hair.

In addition, the silicone emulsion may be applied and used alone, or applied and used in duplicate, or may be applied and used in duplicate with a different composition for cosmetics other than those disposed in the present invention. In addition, the silicone emulsion may be used in accordance with a typical method of use of cosmetics, and the number of times of use may vary depending on the skin condition or taste of a user.

As described above, a silicone emulsion according to the present invention is transparent, high in solid concentration, excellent in feeling in use and durability, and excellent in storage stability at room temperature and high temperatures.

Method for Preparing Silicone Emulsion

A method for preparing a silicone emulsion according to the present invention includes subjecting a non-ionic surfactant to aqueous dispersion, and dividing and introducing a silicone resin mixture 8 times or more to the aqueous dispersed non-ionic surfactant to prepare a mixture.

At this time, the silicone resin mixture includes a silicone resin and a diluent, and a prepared silicone emulsion includes the silicone resin mixture and the non-ionic surfactant at a weight ratio of 1:0.1 to 1:0.4. Specific examples of the silicone resin, the diluent, and the non-ionic surfactant are the same as described with reference to the silicone emulsion above.

Subjecting a Non-Ionic Surfactant to Aqueous Dispersion

In the present step, a non-ionic surfactant is subject to aqueous dispersion.

Specifically, in the present step, a non-ionic surfactant and a solvent may be mixed and subjected to aqueous dispersion. More specifically, in the present step, the non-ionic surfactant may be added to the solvent, and stirred for 10 to 60 minutes to be subjected to aqueous dispersion while raising the temperature to 50 to 70° C., or 55 to 65° C. When the temperature is in the above range at the time of performing aqueous dispersion on the non-ionic surfactant, there is an effect of facilitating the dispersion of the non-ionic surfactant in a paste state.

Also, in the present step, the non-ionic surfactant and the solvent may be mixed at a weight ratio of 1:0.5 to 1:5.0, or 1:0.5 to 1:1.5. When the mixing mass ratio of the non-ionic surfactant and the solvent is in the above range, there is an effect of facilitating the dispersion of the non-ionic surfactant.

Dividing and Introducing Silicone Resin Mixture

In the present step, the silicone resin mixture is portioned and introduced to the aqueous dispersed non-ionic surfactant 8 times or more to prepare a mixture.

Specifically, in the present step, the silicone resin mixture may be portioned and introduced to the aqueous dispersed non-ionic surfactant 8 times to 15 times, or 10 times to 15 times. More specifically, in the present step, the silicone resin mixture may be portioned and introduced to the aqueous dispersed non-ionic surfactant 10 times to 15 times at an interval of 2 to 15 minutes. When a silicone resin mixture is portioned and introduced in the above range of number of times, the silicone resin mixture is emulsified well in a solvent, and when the time interval at the time of portioned introduction is in the above range, it is possible to stably form micelles in an emulsion and to prepare a silicone emulsion with a desired particle size.

In addition, the present step may be performed at 50 to 70° C. Specifically, the present step may be performed at 55 to 65° C. When the present step is performed in the above temperature range, there is an effect in that emulsion particles are formed within the melting point (mp) range of an emulsifier, so that it is possible to prepare a transparent emulsion.

In the present step, the silicone resin mixture may be portioned and introduced to the aqueous dispersed non-ionic surfactant 8 times or more, and then stirred at 100 to 2,000 rpm for 10 to 120 minutes. Specifically, in the present step, the silicone resin mixture may be portioned and introduced to the aqueous dispersed non-ionic surfactant 8 times to 15 times, and then stirred at 500 to 1,500 rpm for 10 to 60 minutes.

The method for preparing a silicone emulsion may further include step (a) secondarily adding and mixing a solvent to the mixture, step (b) adding and mixing a preservative to the mixture secondarily added with the solvent, and step (c) thirdly adding and mixing the solvent to the mixture added with the preservative. In addition, specific examples of the preservative and the solvent are the same as defined with reference to the silicone emulsion above.

At this time, the content of the solvent secondarily added may be 5 to 500 parts by weight based on the 100 parts by weight of the non-ionic surfactant. Specifically, the content of the solvent secondarily added may be 5 to 400 parts by weight, or 10 to 200 parts by weight based on the total weight of the non-ionic surfactant.

In addition, stirring may be performed at 100 to 2,000 rpm for 10 to 360 minutes in the step (a). Specifically, stirring may be performed at 500 to 1,500 rpm for 10 to 240 minutes in the step (a).

The content of the solvent thirdly added may be 10 to 200 parts by weight based on the 100 parts by weight of the non-ionic surfactant. Specifically, the content of the solvent thirdly added may be 10 to 150 parts by weight, or 10 to 120 parts by weight based on the total weight of the non-ionic surfactant.

In the step (c), the solvent may be thirdly added to the mixture added with the preservative, and an additive may be further added thereto, and then mixed. At this time, the additive may be a different additive other than a preservative, and specific examples of the additive are the same as defined with reference to the silicone emulsion above.

MODE FOR CARRYING OUT THE INVENTION

Hereinafter, the present invention will be described in detail through embodiments as follows. However, the following Examples are illustrative of the present invention, and the present invention is not limited by the following Examples.

Example 1

Preparing Silicone Emulsion

Components were used in the composition as described in Table 1, and a silicone resin mixture was portioned and introduced under the process conditions as described in Table 3.

Specifically, Deionized water-1 and a non-ionic surfactant were introduced into a reactor, and stirred for 30 minutes while raising the temperature to 55° C. Thereafter, while the reactor was maintained at 55° C., the silicone resin mixture was portioned and introduced 15 times at a 5 minute interval, and then stirred at 1,000 rpm for 60 minutes. Thereafter, Deionized water-2 was added to the reactor, stirred at 1,000 rpm for 30 minutes, added with a preservative, and then stirred at 1,000 rpm for 30 minutes. Thereafter, Deionized water-3 was added to the reactor, and stirred at 1,000 rpm for 30 minutes to prepare a silicone emulsion.

Examples 2 to 8 and Comparative Examples 1 to 8

Preparing Silicone Emulsion

A silicone emulsion was prepared in the same manner as in Example 1 except that components were used in the compositions as described in Table 1 and Table 2 and a silicone resin mixture was portioned and introduced under the process conditions as described in Table 3.

TABLE 1

| Classification (parts by weight) | | Example 1 | Example 2 | Example 3 | Example 4 | Example 5 | Example 6 | Example 7 | Example 8 |
|---|---|---|---|---|---|---|---|---|---|
| Silicone resin mixture | Total amount | 55 | 55 | 55 | 55 | 55 | 55 | 60 | 55 |
| | Silicone resin | 18 | 18 | 18 | 18 | 18 | 18 | 20 | 27.5 |
| | Diluent | 37 | 37 | 37 | 37 | 37 | 37 | 40 | 27.5 |
| Content of silicone resin in silicone resin mixture (wt %) | | 33 | 33 | 33 | 33 | 33 | 33 | 33 | 50 |
| Non-ionic surfactant | | 15 | 20.9 | 6.05 | 15 | 15 | 15 | 20 | 15 |
| Weight ratio of non-ionic surfactant/silicone resin mixture | | 0.273 | 0.38 | 0.11 | 0.273 | 0.273 | 0.273 | 0.333 | 0.273 |
| Deionized water-1 | | 22 | 16.1 | 22 | 22 | 22 | 22 | 14 | 22 |
| Deionized water-2 | | 3 | 3 | 8 | 3 | 3 | 3 | 2 | 3 |
| Deionized water-3 | | 3 | 3 | 6.95 | 3 | 3 | 3 | 2 | 3 |
| Preservative | | 2 | 2 | 2 | 2 | 2 | 2 | 2 | 2 |
| Total amount | | 100 | 100 | 100 | 100 | 100 | 100 | 100 | 100 |

TABLE 2

| Classification (parts by weight) | | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| Silicone resin mixture | Total amount | 55 | 55 | 55 | 55 | 55 | 55 | 55 | 55 |
| | Silicone resin | 18 | 18 | 14.85 | 34.1 | 18 | 18 | 18 | 18 |
| | Diluent | 37 | 37 | 40.15 | 20.9 | 37 | 37 | 37 | 37 |
| Content of silicone resin in silicone resin mixture (wt %) | | 33 | 33 | 27 | 62 | 33 | 33 | 33 | 33 |
| Non-ionic surfactant | | 4.95 | 22.55 | 15 | 15 | 15 | 15 | 15 | 15 |
| Weight ratio of non-ionic surfactant/ silicone resin mixture | | 0.09 | 0.41 | 0.2727 | 0.2727 | 0.2727 | 0.2727 | 0.2727 | 0.2727 |
| Deionized water-1 | | 22 | 14.45 | 22 | 22 | 22 | 22 | 22 | 22 |
| Deionized water-2 | | 8 | 3 | 3 | 3 | 3 | 3 | 3 | 3 |
| Deionized water-3 | | 8.05 | 3 | 3 | 3 | 3 | 3 | 3 | 3 |
| Preservative | | 2 | 2 | 2 | 2 | 2 | 2 | 2 | 2 |
| Total amount | | 100 | 100 | 100 | 100 | 100 | 100 | 100 | 100 |

TABLE 3

| | When silicone resin mixture is portioned and introduced | | |
|---|---|---|---|
| | Process | Temperature (° C.) | Number of portions |
| Example 1 | Thick phase | 55 | 15 |
| Example 2 | Thick phase | 55 | 15 |
| Example 3 | Thick phase | 55 | 15 |
| Example 4 | Thick phase | 55 | 8 |
| Example 5 | Thick phase | 65 | 12 |
| Example 6 | Thick phase | 54 | 9 |
| Example 7 | Thick phase | 55 | 15 |
| Example 8 | Thick phase | 55 | 15 |
| Comparative Example 1 | Thick phase | 55 | 15 |
| Comparative Example 2 | Thick phase | 55 | 15 |
| Comparative Example 3 | Thick phase | 55 | 15 |
| Comparative Example 4 | Thick phase | 55 | 15 |
| Comparative Example 5 | Thick phase | 73 | 14 |
| Comparative Example 6 | Thick phase | 48 | 13 |
| Comparative Example 7 | Thick phase | 55 | 16 |
| Comparative Example 8 | Thick phase | 55 | 7 |

The manufacturer and product name of each component used in Comparative Examples and Examples are shown in Table 4.

TABLE 4

| Component | Manufacturer and product name | Notes |
|---|---|---|
| Silicone resin mixture | Manufacturer: KCC, product name: SeraSense RB21 | A mixture of an MQ silicone resin and a diluent (poly-dimethylsiloxane) (M/Q molar ratio of silicone resin = 0.78:1, viscosity at 25° C. of silicone resin: 600 cP, Mw of silicone resin: 4,655 g/mol, viscosity at 25° C. of diluent: 100 cP, and Mw of diluent: 3,800 g/mol) |
| Non-ionic surfactant | Manufacturer: Croda, product name: Synperonic ™ PE/F68 (Mw: 8,350 g/mol, Ohv: 13.5 mgKOH/g, and molar ratio of EO:PO:EO = 2.5:1:2.5), Synperonic ™ PE/F108 (Mw: 14,000 g/mol, Ohv: 7.7 mgKOH/g, and molar ratio of EO:PO:EO = 2.4:1:2.4) | A mixture containing PE/F68 and PE/F108 at a weight ratio of 1:1 |
| Preservative | — | 1,2-hexandiol |

Experimental Example

The physical properties of the silicone emulsion of each of Examples and Comparative Examples were measured in the following manner, and the results are shown in Table 5.

(1) Emulsification

The emulsification of the prepared silicone emulsion was confirmed from the appearance of the emulsion by checking whether phases were evenly dispersed without separation.

(2) Color

The color of the prepared silicone emulsion was observed with the naked eye.

(3) Average Particle Diameter of Dispersed Particles

The average particle diameter (μm) of particles dispersed in the silicone emulsion was measured using Master Size 3000 of Marvern Co., Ltd.

(4) Viscosity

The viscosity of the silicone emulsion at 25° C. was measured while stirring the same at 2.5 rpm using a Brookfiled viscometer and a Helipath Stand #93.

(5) Storage Stability

The storage stability was evaluated by confirming whether there is phase separation of the silicone emulsion while leaving the silicone emulsion to stand at 25° C. or 50° C. for 10 days, and when there is no phase separation between an aqueous layer and an oil layer, the storage stability was evaluated as good.
(6) Feeling in Use The silicone emulsion was diluted in water to a concentration of 2.0 wt % to prepare a sample. Thereafter, the sample was used by 10 test subjects to conduct evaluation of feeling in use based on adhesion and coating properties, and the evaluation was conducted on a scale of 5 points.
(7) Durability The same sample as in the above item (6) was used by the same test targets to conduct a durability evaluation, and the evaluation was conducted on a scale of 5 points.
(8) Refractive Index The refractive index (RI) of the silicone emulsion was measured to evaluate transparency.

included in a small amount or an excessive amount with respect to the silicone resin mixture, the silicone emulsions of Comparative Examples 3 and 4 in which the content of the silicone resin in the silicone resin mixture was small or excessive, the silicone emulsions of Comparative Examples 5 and 6 in which the temperature was low or high at the time of portioned introduction of the silicone resin mixture, and the silicone emulsion of Comparative Example 7 in which the number of portions of the silicone resin mixture was large had poor feeling in use and durability. In addition, the silicone emulsion of Comparative Example 8 with a small number of portions of the silicone resin mixture had a disadvantage in that the silicone resin mixture was not emulsified.

TABLE 5

| | Emulsification | Color | Viscosity (cP) | Average particle diameter (μm) | Storage stability 25° C. | Storage stability 50° C. | Feeling in use | Durability | Refractive index |
|---|---|---|---|---|---|---|---|---|---|
| Example 1 | ○ | Transparent | 630,000 | 0.5 | Good | Good | 4.5 | 4.5 | 1.45 |
| Example 2 | ○ | Transparent | 1,000,000 | 2.3 | Separation after 10 days | Separation after 10 days | 4 | 3.5 | 1.42 |
| Example 3 | ○ | Translucent | 350,000 | 3.5 | Separation after 10 days | Separation after 10 days | 4 | 3.5 | 1.41 |
| Example 4 | ○ | Translucent | 580,000 | 2.1 | Separation after 10 days | Separation after 10 days | 4 | 4 | 1.41 |
| Example 5 | ○ | Transparent | 600,000 | 0.6 | Good | Good | 4.3 | 4 | 1.42 |
| Example 6 | ○ | Translucent | 610,000 | 1.7 | Separation after 10 days | Separation after 10 days | 4 | 4 | 1.41 |
| Example 7 | ○ | Transparent | 870,000 | 0.4 | Good | Good | 4.5 | 4.5 | 1.42 |
| Example 8 | ○ | Transparent | 550,000 | 0.7 | Good | Good | 4.5 | 4.5 | 1.42 |
| Comparative Example 1 | ○ | Milky white | 250,000 | 3.6 | Separation after 3 days | Separation after 1 days | 2.5 | 2 | 1.38 |
| Comparative Example 2 | ○ | Milky white | 750,000 | 2.5 | Separation after 7 days | Separation after 7 days | 2.5 | 3 | 1.39 |
| Comparative Example 3 | ○ | Milky white | 550,000 | 0.5 | Separation after 3 days | Separation after 3 days | 3 | 3 | 1.39 |
| Comparative Example 4 | ○ | Milky white | 780,000 | 0.6 | Separation after 7 days | Separation after 3 days | 2.5 | 3 | 1.39 |
| Comparative Example 5 | ○ | Milky white | 450,000 | 0.5 | Separation after 7 days | Separation after 7 days | 3 | 3 | 1.39 |
| Comparative Example 6 | ○ | Milky white | 550,000 | 0.6 | Separation after 7 days | Separation after 7 days | 3 | 3 | 1.38 |
| Comparative Example 7 | ○ | Milky white | 610,000 | 0.5 | Separation 7 after days | Separation 7 after days | 3.5 | 3 | 1.38 |
| Comparative Example 8 | X | — | — | — | — | — | — | — | — |

As shown in Table 5, it can be seen that the silicone emulsion of each of Examples 1 to 8 has the silicone resin mixture emulsified well in the solvent, and has excellent feeling in use and durability. Particularly, the silicone emulsion of each of Examples 1, 5, 7, and 8 is transparent, and has a suitable average particle diameter of dispersed particles, and thus, is excellent in storage stability at room temperature and high temperatures.

On the other hand, the silicone emulsions of Comparative Examples 1 and 2 in which the non-ionic surfactant was

The invention claimed is:
1. A silicone emulsion comprising:
a silicone resin mixture comprising a silicone resin and a diluent; and
a non-ionic surfactant,
wherein the silicone resin mixture and the non-ionic surfactant are included at a weight ratio of 1:0.1 to 1:0.4, and
wherein the silicon resin has the viscosity of 600 to 1,000 cP at 25° C. and the diluent has the viscosity of 10 to 300 cP at 25° C., wherein the diluent comprises an organopolysiloxane, and wherein the silicone resin is represented by Formula 1:

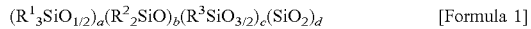
[Formula 1]

In which $R^1$ and $R^3$ are each independently an alkyl group of C1-10 or an alkenyl group of C2-10;

$R^2$ is an alkyl group of C1-10, an alkenyl group of C2-10, or an aryl group of C6-15, a to d are each independently 0 or greater, a+d+c+d is 4 to 10,000, and (a+d+c)/(a+b+c+d) is greater than 0 to 0.7 or less.

2. The silicone emulsion of claim 1, wherein the silicone resin mixture comprises 30 to 60 parts by weight of a silicone resin and 40 to 70 parts by weight of a diluent based on the total weight of the silicone resin mixture.

3. The silicone emulsion of claim 1, wherein the non-ionic surfactant comprises PEG and PPG at a molar ratio of 2:1 to 6:1.

4. The silicone emulsion of claim 3, wherein the non-ionic surfactant is an ethylene oxide (EO)-propylene oxide (PO)-ethylene oxide (EO) block copolymer, and comprises EO-PO-EO at a molar ratio of 1:1:1 to 3:1:3.

5. A method for preparing the silicone emulsion of claim 1, the method comprising:
  subjecting a non-ionic surfactant to aqueous dispersion; and
  dividing and introducing a silicone resin mixture 8 times or more to the aqueous dispersed non-ionic surfactant to prepare a mixture, wherein:
    the silicone resin mixture includes a silicone resin and a diluent; and
    the silicone resin mixture and the non-ionic surfactant are included at a weight ratio of 1:0.1 to 1:0.4.

6. The method of claim 5, wherein the silicone resin mixture is divided and introduced 8 times to 15 times.

7. The method of claim 5, wherein the preparing of the mixture is performed at 50 to 70° C.

8. The silicone emulsion of claim 1, wherein the silicone resin mixture and the non-ionic surfactant are included at a weight ratio of 1:0.15 to 1:0.35.

9. The method of claim 5, wherein the silicone resin mixture and the non-ionic surfactant are included at a weight ratio of 1:0.15 to 1:0.35.

10. The silicone emulsion of claim 1, further comprising a solvent selected from the group consisting of deionized water, pure water, ultra-pure water, and distilled water.

11. The method of claim 5, comprising adding a solvent selected from the group consisting of deionized water, pure water, ultra-pure water, and distilled water.

12. The silicone emulsion of claim 1, further comprising a preservative selected from the group consisting of sodium benzoate, phenoxy ethanol, 1,2-hexanediol, propylene glycol, diazolidinyl urea, imidazolidinyl urea, 15quaternium, DMDM hydantoin, benzalkonium chloride, 2-bromo-2-Nitro-propane-1,3-diol, dehydroacetic acid, 2-dichloro-benzyl alcohol, sodium hydroxymethyl-glycinate, triclosan, benzoic acid, chlorobenzoic acid, benzyl alcohol, salicylic acid, sodium iodate, sorbic acid, calcium benzoate, methyl benzoate, and benzyl benzoate.

13. The method of claim 5, comprising adding a preservative selected from the group consisting of sodium benzoate, phenoxy ethanol, 1,2-hexanediol, propylene glycol, diazolidinyl urea, imidazolidinyl urea, 15quaternium, DMDM hydantoin, benzalkonium chloride, 2-bromo-2-Nitro-propane-1,3-diol, dehydroacetic acid, 2-dichloro-benzyl alcohol, sodium hydroxymethyl-glycinate, triclosan, benzoic acid, chlorobenzoic acid, benzyl alcohol, salicylic acid, sodium iodate, sorbic acid, calcium benzoate, methyl benzoate, and benzyl benzoate.

14. The silicone emulsion of claim 1, further comprising a neutralizer selected from the group consisting of a citric acid, an acetic acid, a lactic acid, a formic acid, a nitric acid, a glycolic acid, and a phosphoric acid.

15. The method of claim 5, comprising adding a neutralizer selected from the group consisting of a citric acid, an acetic acid, a lactic acid, a formic acid, a nitric acid, a glycolic acid, and a phosphoric acid.

16. The silicone emulsion of claim 1, wherein the diluent is a linear organopolysiloxane.

17. The method of claim 5, wherein the diluent is a linear organopolysiloxane.

18. The silicone emulsion of claim 1, wherein the diluent is a cyclic organopolysiloxane.

19. The silicone emulsion of claim 5, wherein the diluent is a cyclic organopolysiloxane.

20. The silicone emulsion of claim 1, wherein the silicon resin has the viscosity of 600 to 700 cP at 25° C.

* * * * *